United States Patent
Yamaguchi et al.

(10) Patent No.: US 6,480,674 B2
(45) Date of Patent: Nov. 12, 2002

(54) LENS-FITTED FILM UNIT AND PRODUCTION METHOD THEREOF

(75) Inventors: Hiroshi Yamaguchi, Hino (JP); Shuri Mizoguchi, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/725,829

(22) Filed: Nov. 29, 2000

(65) Prior Publication Data

US 2001/0041065 A1 Nov. 15, 2001

(30) Foreign Application Priority Data

Dec. 3, 1999 (JP) .......................................... 11-344676

(51) Int. Cl.⁷ .......................... G03B 7/02; G03B 1/00; G03B 17/02
(52) U.S. Cl. .......................... 396/6; 396/281; 396/284; 396/411
(58) Field of Search .............................. 396/6, 284, 411, 396/281, 395

(56) References Cited

U.S. PATENT DOCUMENTS 4,486,083 A * 12/1984 Takada et al. .............. 396/284
5,737,640 A * 4/1998 Zander et al. .............. 396/284
5,809,351 A * 9/1998 Albrecht ..................... 396/284
5,862,414 A   1/1999 Zawodny et al. ........... 396/395
5,897,222 A * 4/1999 Cipolla et al. .............. 396/284
5,918,082 A   6/1999 Katsura ........................ 396/6

FOREIGN PATENT DOCUMENTS

JP          05 333475          12/1993

* cited by examiner

Primary Examiner—D Rutledge
(74) Attorney, Agent, or Firm—Cantor Colburn LLP

(57) ABSTRACT

A lens-fitted unit includes a photographic film loaded in advance, a shutter, a taking lens, an exposure counter plate that is provided with numerals indicating the number of exposures or the number of exposed frames, and is moved in one direction for each exposure, and an exposure counter window through which the numeral on the exposure counter plate can be recognized. A distance between the prescribed numeral on the exposure counter plate and the immediate neighboring numeral provided to be next to the prescribed numeral on a downstream side in a moving direction of the exposure counter plate is greatest, compared with other distances between other immediate neighboring numerals on the exposure counter plate.

13 Claims, 5 Drawing Sheets

DOWNSTREAM SIDE

UPSTREAM SIDE

DOWNSTREAM SIDE

UPSTREAM SIDE

LENS-FITTED FILM UNIT AND PRODUCTION METHOD THEREOF

BACKGROUND OF THE INVENTION

The present invention relates to a lens-fitted film unit wherein each of films of two or more types each having a different number of exposures can be loaded at need, and an exposure counter plate on which the number of exposures for unexposed frames is indicated with numerals or symbols is used in common for the films of various types, and to a production method of the lens-fitted film unit.

With regard to a lens-fitted film unit, a film having a different number of exposures is loaded despite the same camera specifications for shipment of the lens-fitted film unit.

On the other hand, an exposure counter plate which indicates the number of exposures with a numeral or with a symbol is provided on a lens-fitted film unit, and the exposure counter plate is arranged so that it may be recognized through an exposure counter window provided on an enclosure member. This exposure counter plate is an exposure counter plate of the so-called backward counting type on which the number of exposures for unexposed frames is indicated. Therefore, in a lens-fitted film unit wherein a film of 39 exposures is loaded, for example, it is constituted so that the numeral indicated in the course of the first exposure is 39, and this numeral is deducted one by one in each exposure so that the remaining number of exposures may be made out.

Incidentally, it is difficult to indicate all numerals on the exposure counter plate, and therefore, the numerals are skipped one numeral apart or two numerals apart to be indicated, and in some cases, a symbol or symbols such as a small circle or small circles are indicated between the indicated numerals.

In this case, in lens-fitted film units wherein two or more types of films each having a different number of exposures are loaded despite the same camera specifications, it is only the exposure counter plate that varies depending on the film variations. However, molding of an exposure counter plate that varies depending on film variation is a waste of an expense for metallic molds. Therefore, the numerals up to the maximum number of exposures to be used are formed to be convex on the exposure counter plate, and the numbers of exposures including the number of exposures corresponding to the film used and numerals smaller than the number of exposures are colored by means of roll leaf hot stamping. For example, in the lens-fitted film unit used commonly for a film of 39 exposures and a film of 27 exposures, the numerals up to the figure of 39 are molded on the exposure counter plate, and when a film of 39 exposures is loaded, the exposure counting plate on which all numerals and symbols are colored is used, while when a film of 27 exposures is loaded, the exposure counting plate on which the numeral 27 and numerals less than the numeral 27 and symbols are colored is used.

Incidentally, there is also available a lens-fitted film unit employing an exclusive exposure counter plate which varies depending on a film used.

As stated above, there have been prepared two types of exposure counter plates differing each other in terms of coloring in the past, to comply with films each being different from another in terms of the number of exposures. However, the exposure counter plates are alike to cause mistakes easily, and thereby, control had to be made sufficiently on the production site, which has taken a long time.

After an exposed film is taken out of a lens-fitted film unit in a photofinishing laboratory, the unit from which the film has been taken out is collected and reused by a maker of the lens-fitted film unit. In this case, the exposure counter plate varies in accordance with the number of exposures of the film loaded, even in the case of the lens-fitted film unit having the same specifications as stated above. Therefore, when a prescribed film is loaded in a reused lens-fitted film unit, an exposure counter plate complying with the number of exposures of the above-mentioned film needs to be used. For this reason, it was necessary to select exposure counter plates in advance for the collected lens-fitted film units and thereby to replace exposure counter plates when they are different.

Further, when a different and exclusive exposure counter plate is prepared in accordance with a film, the number of mistakes is reduced, but an expense of metallic molds is increased, and jobs for selection and replacement are needed when lens-fitted film units are collected.

SUMMARY OF THE INVENTION

In view of the problems mentioned above, the invention has been achieved, and its object is to provide a lens-fitted film unit wherein the exposure counting plate that is exactly the same as others can be used even when a length of the film to be loaded varies, and thereby, selection and replacement of the exposure counting plates have been made unnecessary, and to provide a production method for the lens-fitted film unit.

The object mentioned above can be attained by either one of the following Structures.

Structure 1: A lens-fitted film unit comprising a photographic film loaded in advance, a shutter, a picture taking lens, an exposure counter plate that is provided with numerals indicating the number of exposures or the number of exposed frames, and is moved in one direction for each exposure, and an exposure counter window through which the numeral on the exposure counter plate can be recognized wherein, a difference between a prescribed numeral provided on the exposure counter plate and a numeral provided to be next to the prescribed numeral and on the downstream side in the moving direction of the exposure counter plate is greatest, compared with other distances between other neighboring numerals on the aforesaid exposure counter plate.

Structure 2: The lens-fitted film unit according to Structure 1, wherein only one distance between the prescribed numeral and the neighboring numeral on the downstream side is greatest.

Structure 3: The lens-fitted film unit according to Structure 1, wherein a difference between the prescribed numeral and the immediate neighboring numeral on the downstream side is not less than 4.

Structure 4: The lens-fitted film unit according to Structure 1, wherein the prescribed numeral is either one in the range from 24 to 30.

Structure 5: The lens-fitted film unit according to Structure 1, wherein any of the first photographic film having the number of exposures representing the first number of exposures and the second photographic film having the number of exposures representing the second number of exposures that is less than the first number of exposures can be loaded in the lens-fitted film unit, and at least one of the first photographic film and the second photographic film is loaded in the lens-fitted film unit in advance, and the prescribed numeral stated above is either one of the second number of exposures, a numeral that is more than the second number of exposures by 1 and a numeral that is more than the second number of exposures by 2.

Structure 6: The lens-fitted film unit according to Structure 5, wherein, with regard to a distance between the prescribed numeral and the numeral provided to be next to the prescribed numeral and on the downstream side in the moving direction of the exposure counter plate, when the prescribed numeral is located in the exposure counter window at the uppermost position toward the upstream side in the moving direction of the exposure counter plate toward the upstream side in a way that the prescribed numeral can be observed totally through the exposure counter window, the neighboring numeral on the downstream side can not be observed through the exposure counter window, and when the prescribed numeral is located in the exposure counter window at the uppermost position toward the upstream side in the moving direction of the exposure counter plate toward the upstream side in a way that the prescribed numeral can be observed partially through the exposure counter window, the neighboring numeral on the downstream side can be observed partially through the exposure counter window.

Structure 7: The lens-fitted film unit according to Structure 4, wherein, the prescribed numeral stated above is 27, and the neighboring numeral on the downstream side is 32.

Structure 8: The lens-fitted film unit according to Structure 7, wherein, numerals from 32 up to 40 on the exposure plate are marked with a space of three numerals corresponding to three frames.

Structure 9: The lens-fitted film unit according to Structure 7, wherein, on the upstream side of the numeral 27, there are marked numerals down to 3 with a space of two frames between, and on the upstream side of 3, there is marked numeral of 1 with a space of one frame.

Structure 10: The lens-fitted film unit according to Structure 1, wherein, the numerals marked on the exposure counter are provided through at least one of molding and printing.

Structure 11: A production method for a lens-fitted film unit package comprising a step of positioning an exposure counter and a step of manufacturing a lens-fitted film unit package by packing a lens-fitted film unit with a packing member, wherein the lens-fitted film unit has therein a photographic film loaded in advance, a shutter, a taking lens, an exposure counter plate which is provided with numerals indicating the number of unexposed frames or the number of frames exposed and is moved in the fixed direction for each photographing, and an exposure counter window through which the numeral on the exposure counter plate can be observed from the outside and wherein a distance between a prescribed numeral provided on the exposure counter plate and a numeral provided to be next to the prescribed numeral and on the downstream side in the moving direction of the exposure counter plate is greatest, and wherein the prescribed numeral is positioned to be closer to the upstream side than an indicator on the exposure counter window by one frame in the moving direction of the exposure counter plate, in the step for positioning of the exposure counter plate, and the prescribed numeral is positioned to be closer to the upstream side than an indicator on the exposure counter window by one frame in the moving direction of the exposure counter plate, in the step for packing a lens-fitted film unit with a packing member.

Further, the preferable structures are as follows.

Structure 10: A lens-fitted film unit in which an exposure counter plate which is provided with numerals indicating the number of frames to be exposed or the number of exposed frames and is moved in the fixed direction for each photographing, and an exposure counter window through which the numeral marked on the exposure counter plate can be observed from the outside are provided, and two or more types of films including the first film having the first number of exposures and the second film having the second number of exposures that is less than the first number of exposures can be loaded, wherein the exposure counter plate is provided with the numeral indicating at least the second number of exposures, and with regard to a distance between the numeral and a numeral that is provided to be next to the above-mentioned numeral and on the downstream side in the moving direction of the exposure counter plate, the numeral provided on the downstream side can not be observed through the exposure counter window when located at the uppermost position toward the upstream side in the exposure counter window in the moving direction of the exposure counter plate in a way that the whole of the numeral indicating the second number of exposures can be observed, and a part of the numeral provided on the downstream side can be observed through the exposure counter window when located at the uppermost position toward the upstream side in the exposure counter window in the moving direction of the exposure counter plate in a way that a part of the numeral indicating the second number of exposures can be observed.

Structure 11: The lens-fitted film unit according to Structure 10, wherein a difference between the numeral indicating the second number of exposures and the numeral provided on the downstream side is not less than 4.

Structure 12: The lens-fitted film unit according to Structure 10 or Structure 11, wherein a distance between the numeral indicating the second number of exposures and the numeral provided on the downstream side both on the exposure counter plate is greater than other distances between other numerals.

Structure 13: The lens-fitted film unit according to either one of Structure 10–Structure 12, wherein the numeral that is provided on the exposure counter plate and indicates the second number of exposures is 27, the numeral provided on the downstream side is 32, and numerals up to 40 are marked with a space of three numerals corresponding to three frames between on the downstream side of the numeral of 32.

Structure 14: The lens-fitted film unit according to Structure 13, wherein on the upstream side of the numeral 27 provided on the exposure counter plate, there are marked numerals down to 3 with a space of two frames between, and on the upstream side of 3, there is marked numeral of 1 with a space of one frame between.

Structure 15: The lens-fitted film unit according to either one of Structure 10–Structure 14, wherein the numerals stated above are formed through at least one of molding and printing.

Structure 16: A production method for a lens-fitted film unit for producing a lens-fitted film unit described in either one of Structure 10–Structure 15, wherein a process to make the numeral indicating the second number of exposures to be positioned closer to the upstream side by one frame than a position of the indicator of the exposure counter window and a process for packing with a packing member under the condition that the indication of the exposure counter plate is closer to the upstream side by one frame, are provided.

DETAILED DESCRIPTION OF THE PREFERRED EMBODIMENT

A lens-fitted film unit of the invention has therein a photographic film loaded in advance, a shutter, a taking lens, an exposure counter plate that is provided with numerals indicating the number of exposures or the number of exposed frames and is moved in one direction for each exposure, and an exposure counter window through which the numeral marked on the exposure counter plate can be recognized from the outside, and a distance between a prescribed numeral provided on the exposure counter plate and a numeral provided to be next to the prescribed numeral and on the downstream side in the moving direction of the exposure counter plate is greatest, compared with other distances between other neighboring numerals on the aforesaid exposure counter plate. Incidentally, the exposure counter window may either be just a hole section or be covered with plastic or glass.

In addition, it is preferable that the distance for only one location is greatest. It is more preferable that a difference between the prescribed numeral and the aforesaid neighboring numeral on the downstream side is not less than 4.

Figure 3:
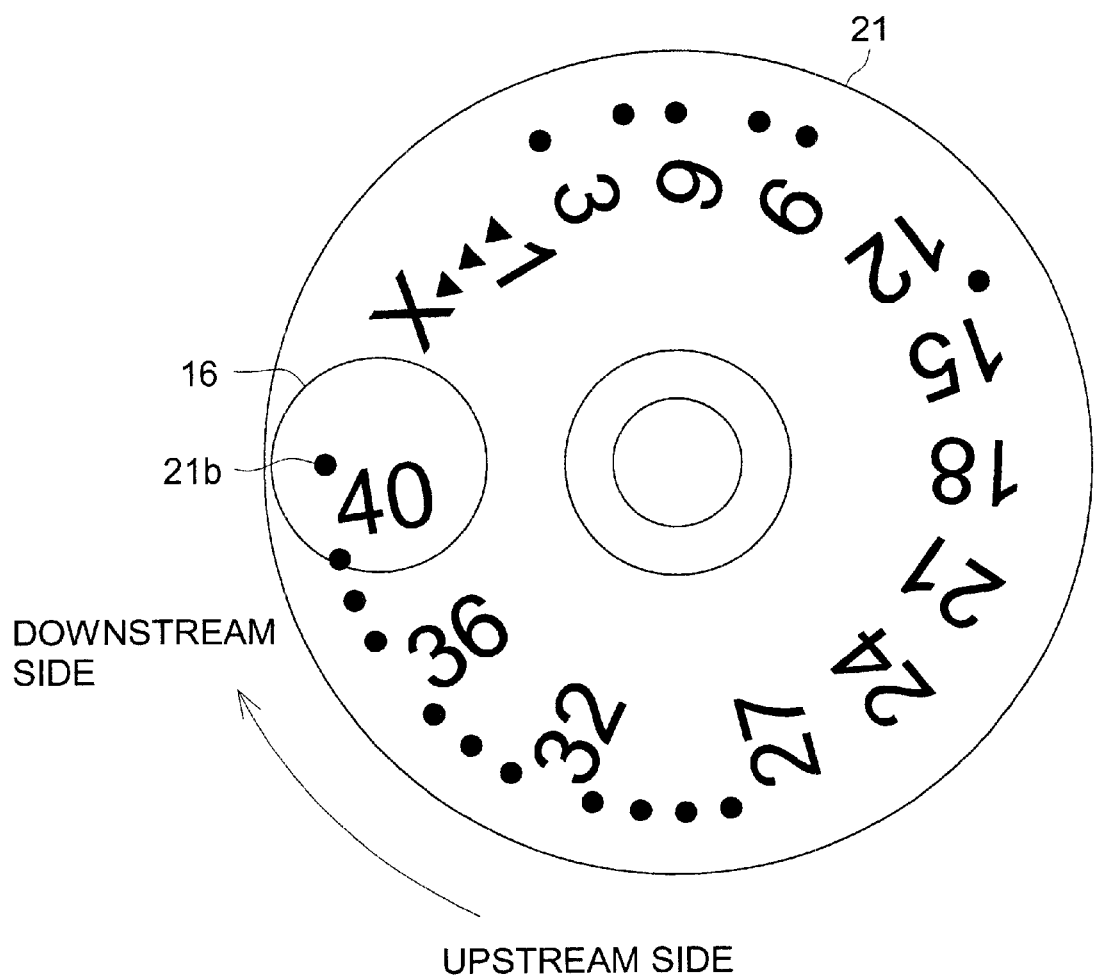
FIG. 3 is an enlarged view of an exposure counter plate for which a film with 40 exposures is used.

For example, FIG. 3 shows an example thereof. In this case, the prescribed numeral is 27 and the neighboring numeral on the downstream side is 32. A distance between 27 and 32 is greatest, compared with other distances between neighboring numerals on the exposure counter plate (for example, between 32 and 36, between 24 and 27).

The number of locations where the distance is greatest is only one.

Incidentally, in the case of plural occasions wherein a difference between neighboring numerals is not less than 4 (for example, at least one combination (combination of 27 and 32 in this case) among combination of 32 and 36, combination of 36 and 40 and combination of 27 and 32) as shown in FIG. 3, it is required to satisfy the condition that "a distance between the prescribed numeral and the neighboring numeral marked on the downstream side is greatest, compared with other distances between neighboring numerals on the exposure counter plate". It is preferable to satisfy the condition that "a distance between the prescribed numeral and the neighboring numeral marked on the downstream side is greatest, compared with other distances between neighboring numerals on the exposure counter plate" in those wherein a difference between neighboring numerals is greatest.

It is further preferable that the prescribed numeral is either one of 24–30. For example, the prescribed numeral is 27 and the neighboring numeral on the downstream side is 32. It is also possible to arrange so that numerals up to 40 are provided with a space of three numerals between on the downstream side of the numeral 32. On the upstream side of the numeral 27, there are provided numerals down to 3 with a space of two numerals between, while on the upstream side of 3, numerals 1, there may be marked numerals of 1 with a space of one frame between.

It is preferable that numerals provided on the exposure counter plate are formed through either one of molding and printing. It is further preferable, from the viewpoint of positioning, that the exposure counter plate is provided with at least 6 hole sections.

It is especially preferable that 6 though holes and one recessed portion which is not through and is concave are provided. Further, it is preferable that the number of locations where a distance between hole sections is 1 mm or less is one.

It is preferable that any one of the first photographic film having the first number of exposures and the second photographic film having the second number of exposures can be loaded in a lens-fitted film unit, and either one of the first photographic film and the second photographic film is loaded in the lens-fitted film unit in advance. In this case, it is preferable that the prescribed numeral is either one of the second number of exposures, the numeral that is more than the second number of exposures by 1 and the numeral that is more than the second number of exposures by 2.

Incidentally, "first number of exposures (first number of frames)" and "second number of exposures (second number of frames)" mentioned in this case are not determined by a length of the film but are determined by the lens-fitted film unit. Namely, when "X Exposures" is printed on a lens-fitted film unit, the "X" represents the first number and the second number.

Further, when "any one of the first photographic film having the first number of exposures and the second photographic film having the second number of exposures can be loaded in a lens-fitted film unit, and either one of the first photographic film and the second photographic film is loaded in the lens-fitted film unit in advance, and the prescribed numeral is either one of the second number of exposures, the numeral that is more than the second number of exposures by 1 and the numeral that is more than the second number of exposures by 2", with regard to a distance between the prescribed numeral and the numeral that is next to the prescribed numeral and is provided on the downstream side in the moving direction of the exposure counter plate, the neighboring numeral on the downstream side cannot be identified through the exposure counter window, under the condition wherein the prescribed numeral is located at the uppermost position toward the upstream side in the exposure counter window in the moving direction of the exposure counter plate so that whole of the prescribed numeral can be observed through the exposure counter window and a part of the neighboring numeral on the downstream side can be observed through the exposure counter window, under the condition that the prescribed numeral is located at the uppermost position toward the upstream side in the exposure counter window in the moving direction of the exposure counter plate so that the part of the prescribed numeral can be observed through the exposure counter window.

Incidentally, "can not be identified" mentioned here means the state wherein the numeral can not be seen utterly (the state of impossible observation) or the state wherein a part of the numeral can be seen but the numeral can not be discriminated. Further, "a part of the numeral can be observed" mentioned here means the state wherein the numeral can be discriminated by a part of the numeral which can be observed. Under the state wherein the prescribed numeral is located at the uppermost position toward the upstream side in the exposure counter window in the moving direction of the exposure counter plate so that a part of the prescribed numeral can be observed through the exposure counter window, it naturally is not always necessary that a part of the neighboring numeral on the downstream side can be observed through the exposure counter window, and there may be an occasion where a part of the neighboring numeral on the downstream side can not be observed through the exposure counter window.

Figure 1:
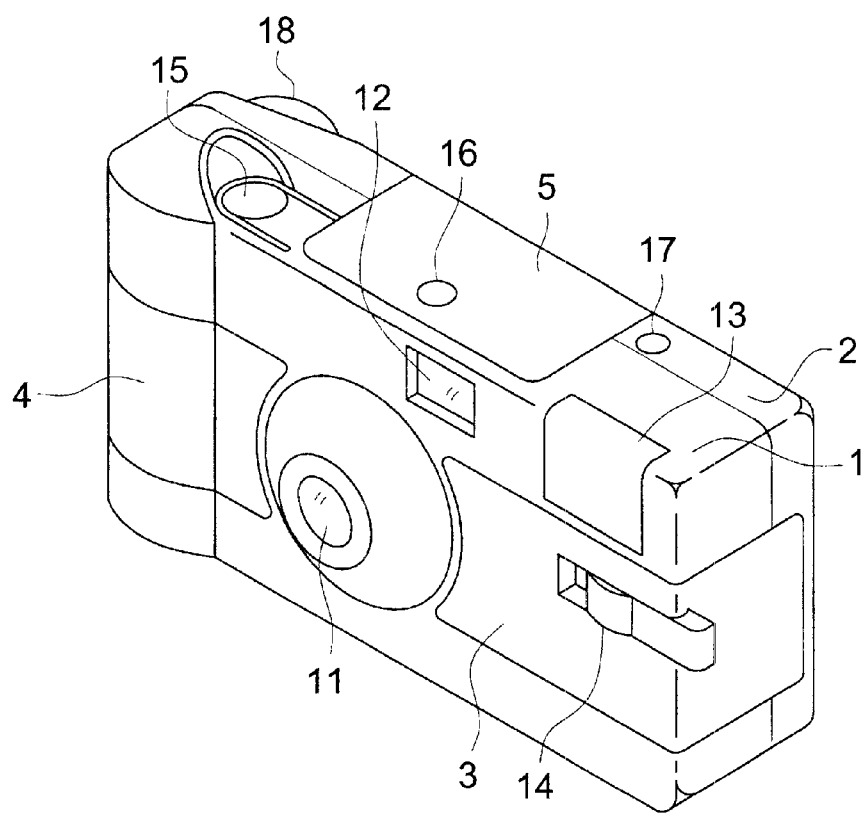
FIG. 1 is a perspective view of an appearance of a lens-fitted film unit.
Figure 2:
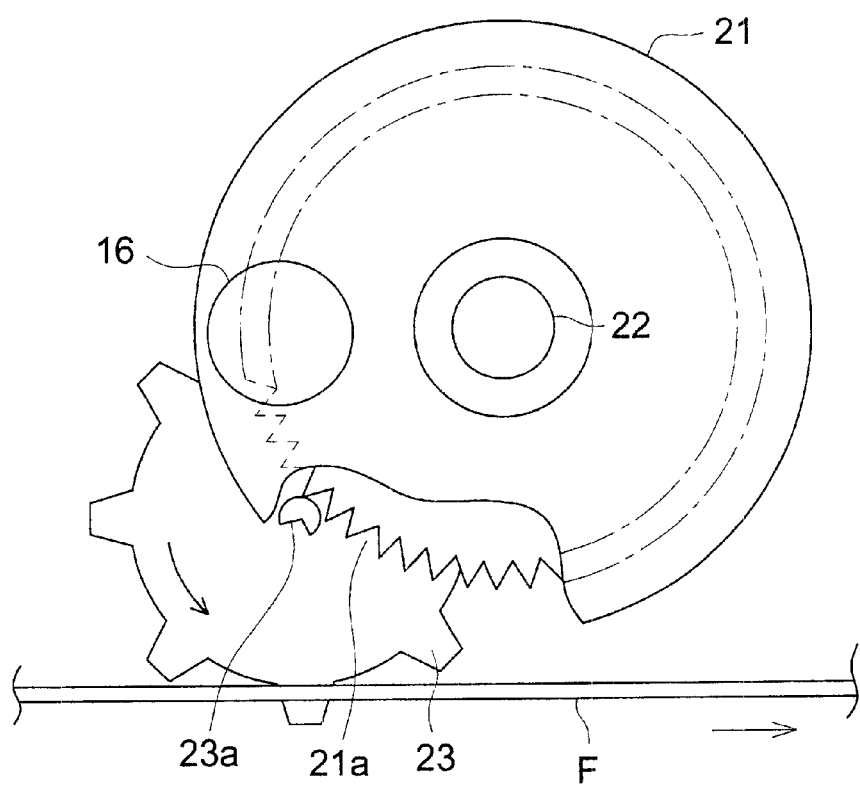
FIG. 2 is a diagram showing operations of an exposure counter plate.
Figure 4:
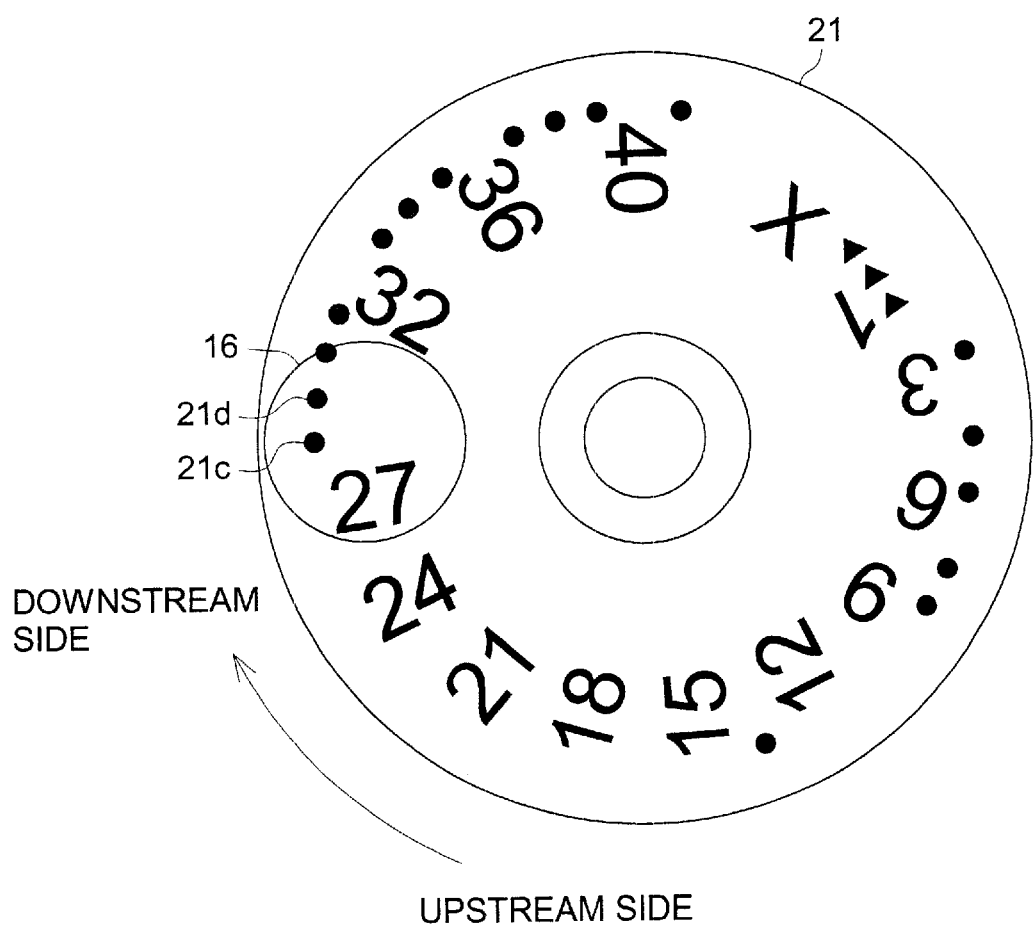
FIG. 4 is an enlarged view of an exposure counter plate for which a film with 27 exposures is used.

An embodiment of a lens-fitted film unit of the invention will be explained as follows, referring to FIG. 1–FIG. 4. FIG. 1 is a perspective view of an appearance of a lens-fitted film unit, FIG. 2 is a diagram showing operations of an exposure counter plate, FIG. 3 is an enlarged view of an exposure counter plate for which a film with 40 exposures is used, and FIG. 4 is an enlarged view of an exposure counter plate for which a film with 27 exposures is used.

FIG. 1 shows an example of a lens-fitted film unit of the invention wherein front sides of various kinds of mechanisms and a film loaded are covered by front cover 1, and rear sides of them are covered by rear cover 2. Label 3 is stuck on the front cover and the rear cover to cover the front central portion on the right side and the right flank of the front cover 1 and to cover the right flank of the rear cover 2, and Label 4 is stuck on the front cover and the rear cover to cover the front central portion on the left side and the left flank of the front cover 1 and to cover the left flank of the rear cover 2. Further, label 5 is stuck to cover the top surface of the front cover 1 and the top surface, the rear surface and the bottom surface of the rear cover 2. Incidentally, a product name and a simple operation manual are printed on each label.

Taking lens 11 is arranged at the central portion on the front side of the front cover 1, and objective lens window 12 of a view-finder is arranged above the taking lens 11. On the right side of the objective lens window 12, there is arranged strobe (electronic flash) flashing section 13 below which strobe operating member 14 that slides laterally to operate a main switch of the strobe is arranged.

On the top surface of the front cover 1, there is arranged shutter-release button 15, and exposure counter window 16 for observing an exposure counter plate is arranged on the right side of the shutter-release button 15. Further, on the top surface of the rear cover 2, there is arranged neon tube window 17 that shows that a strobe has been charged.

Film-winding knob 18 is arranged to be protruded from the rear side of the rear cover 2.

Now, let it be assumed that two types of lens-fitted film units each having a different number of exposures are produced by loading a film with 40 exposures or a film with 27 exposures, at need, in the lens-fitted film unit. With regard to a film cartridge in this case, if the cartridge can house a film with 40 exposures, it naturally can house a film with 27 exposures too. Therefore, if the cartridge for a film with 40 exposures is used in a lens-fitted film unit, a film with 27 exposures can also be loaded in the same lens-fitted film unit.

Under the assumption that all photographing mechanisms are used in common, only one item which should be excluded is an exposure counter plate as described in the prior art. In the invention, this exposure counter plate is made to be used in common, which will be described in detail.

Incidentally, in the finished lens-fitted film unit, it is necessary to distinguish the film loaded, namely, the number of exposures, and therefore, the printed indication on label 5, for example, needs to be changed accordingly.

Next, the exposure counter plate will be explained as follows, referring to FIG. 2–FIG. 4.

In FIG. 2, the numeral 21 represents an exposure counter plate on which the numerals and symbols shown in FIGS. 3 and 4 are printed through hot stamping, and the exposure counter plate 21 rotates around shaft 22. The numeral 23 represents a sprocket which engages with perforations on film F. On the central tip of sprocket 23, there is provided exposure counter plate driving section 23a having thereon a partial V-shaped cutout which engages with double helical gear 21a formed under the exposure counter plate 21. Incidentally, numerals and symbols on the exposure counter plate 21 are indicated to correspond a pitch of the gear 21a.

Incidentally, with regard to the numerals and symbols on the exposure counter plate 21, it is preferable that they are formed to be convex and then are subjected to printing by hot stamping to be colored, but in some cases, they may also be formed to be convex without being printed, or they may be formed to be flat and then are printed.

When film-winding knob 18 is rotated by a user in the course of photographing, film F is conveyed in the arrow direction to be rolled in an unillustrated cartridge one frame by one frame. When this film F is conveyed, sprocket 23 rotates counterclockwise. There are 8 perforations at a portion corresponding to a length of one frame of film F and sprocket 23 itself has 8 teeth. Therefore, when the sprocket 23 makes one turn, an unillustrated film-winding-stop mechanism works and the sprocket 23 stops rotating. In this case, gear 21a of the exposure counter plate 21 rotates clockwise by one pitch in accordance with one turn of the exposure counter plate driving section 23a. Therefore, the numerals and symbols indicating the number of exposures shown on the exposure counter plate 21 also rotate by one frame.

The numeral 16 represents an exposure counter window, and when a film with 40 exposures is loaded for shipment, the position of the exposure counter plate 21 against the exposure counter window 16 is made to be one shown in FIG. 3. To be concrete, shipment is conducted by packing with a packing member under the state wherein small circle 21b positioned to be away from the numeral of 40 showing the maximum number of exposures by one frame equivalent in the clockwise direction can be observed through the exposure counter window 16 on the line connecting the central position of the exposure counter window 16, namely the center of the exposure counter plate 21 and the center of the exposure counter window 16, and the numeral of 40 showing the maximum number of exposures can be observed at the uppermost position toward the upstream side in the rotational moving direction of the exposure counter window 16. When a user conducts film-winding for one frame prior to photographing, the exposure counter plate 21 rotates clockwise, and the numeral of 40 moves toward the downstream side in the rotational moving direction of the exposure counter plate, and thereby, the numeral of 40 is positioned at the central position of the exposure counter window 16 to make photographing for the first frame possible.

After this, the exposure counter plate rotates clockwise (downstream side) one frame by one frame for each film winding, and when photographing is carried out under the state wherein the numeral of 1 is indicated, this represents an end of photographing for all frames.

Next, when a film with 27 exposures is loaded in the same lens-fitted film, the exposure counter plate 21 is not replaced, but it is made to be one shown in FIG. 4 to be packed with a packing member for shipment. To be concrete, small circle 21c positioned to be away from the numeral 27 in the clockwise direction (downstream side) by one frame equivalent can be observed at the central position of the exposure counter window 16, small circle 21d can be observed to be away in the clockwise direction (downstream side) by one frame equivalent, and the numeral of 27 can be observed at the uppermost position toward the upstream side in the rotational direction of the exposure counter plate of the exposure counter window 16.

Due to this, the numeral greater than the numeral of 27 can not be seen by a user through the exposure counter window 16 even before the photographing for the first frame, which does not give a sense of incompatibility to the user.

Incidentally, on the exposure counter plate 21, numerals from the numeral 1 to numeral 3 are arranged with a space of one frame, numerals from the numeral 3 to numeral 27 are arranged with a space of two frames, the greater numeral arranged after the numeral of 27 is made to be 32 and the numeral of 27 and the numeral 32 are arranged with a space of 4 frames, and numerals from the numeral of 32 to the numeral of 40 are arranged with a space of 3 frames.

Figure 5:
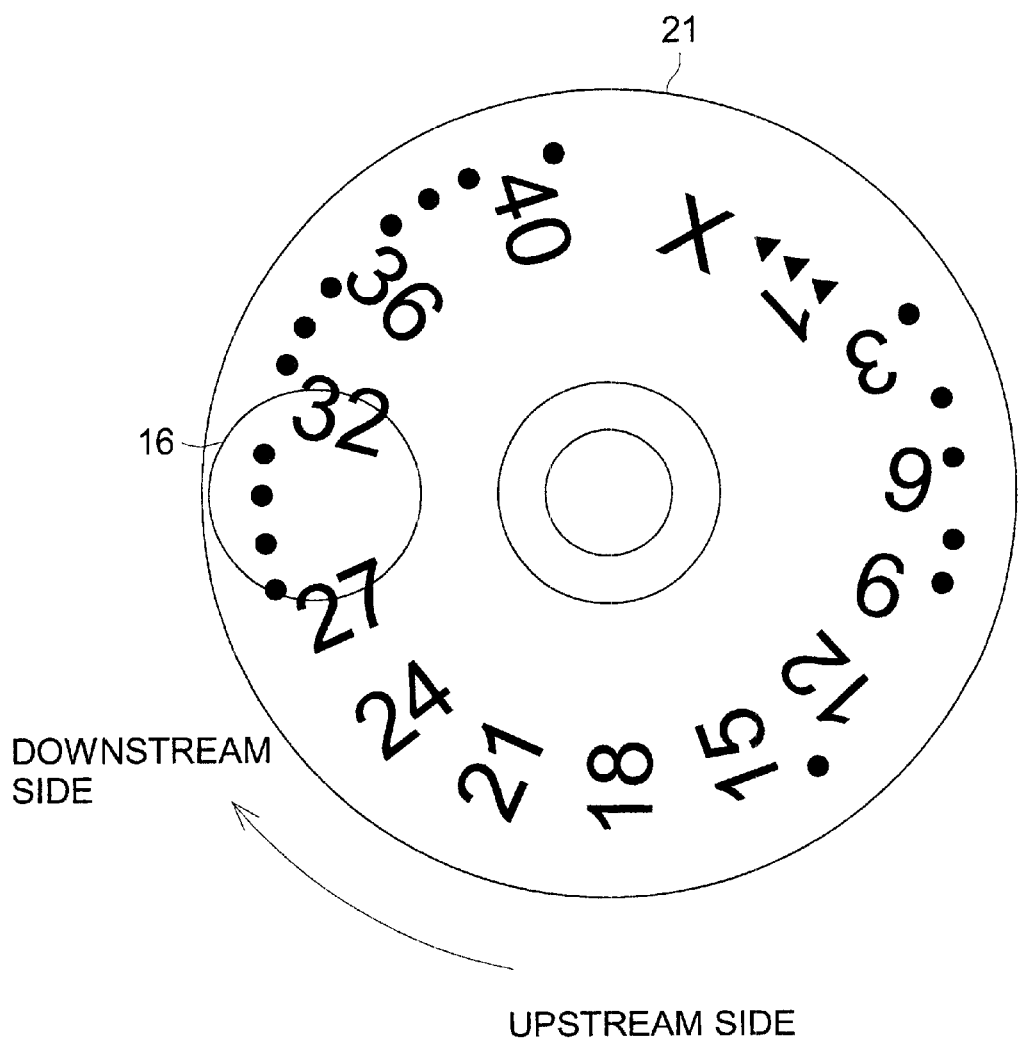
FIG. 5 is an enlarged view of an exposure counter plate in which a part of the numeral 32 and a part of the numeral 27 are observed through an exposure counter window.

As shown in FIG. 5, a distance between the numeral 27 and numeral 32 is made to be a distance wherein a part of the numeral 32 positioned to be at the downstream side of the numeral 27 is located at the downstream side of the exposure counter window 16 when a part of the numeral 27 is in an observable position on the upstream side of the exposure counter window 16 in the rotational moving direction of the exposure counter plate. In the case of a product in which a film with 40 exposures is loaded, therefore, photographing operations equivalent to 4 frames are conducted between the numeral of 32 and the numeral of 27, and even in the period of the photographing operations, a part of 32 and a part of 27 are always seen, and the number of remaining exposures can easily be confirmed.

The foregoing is an explanation of how to produce newly lens-fitted film units in two types each having a different number of exposures, and when loading a film with 27 exposures by reusing collected lens-fitted film units, exposure counter plates 21 each being shifted individually in terms of its position need to be adjusted to be in the state shown in FIG. 4.

Incidentally, when a 135 film is used, a combination does not always need to be the combination of 40 exposures and 27 exposures, but it may also be the combination of two types among 39 exposures, 36 exposures, 24 exposures and 12 exposures, and it may further be the combination of three types.

Further, in the case of IX 240 (APS), any combination among 40 exposures, 25 exposures and 15 exposures can be selected.

Further, the exposure counter plate mentioned above is of a backward counting type that indicates the number of unexposed frames. However, the invention is not limited to this, and can be applied also to a forward counting type that indicates the number of exposed frames.

In the lens-fitted film unit of the invention and the production method of the lens-fitted film unit, even when the films of various lengths are loaded in the lens-fitted film units, it is possible to use the same exposure counter plate, which makes it unnecessary to select and replace the exposure counter plate.

Disclosed embodiment can varied by a skilled person without departing from the spirit and scope of the invention.

What is claimed is:

1. A lens-fitted film unit comprising:
   (a) a photographic film loaded in advance;
   (b) a shutter;
   (c) a picture taking lens;
   (d) an exposure counter plate that is provided with numerals indicating a number of firms to be exposed or a number of frames which has been exposed, and is moved in one direction for each exposure; and
   (e) an exposure counter window through which a numeral on the exposure counter plate is recognized from an outside,
   wherein the numerals are provided on the exposure counter plate so hat at least a part of one of the numerals is capable of being observed through the exposure counter window, the exposure counter plate includes a maximum value of distances among immediate neighboring numerals on the exposure counter plate, and a distance between a prescribed numeral, which is either one numeral in the range from 24 to 30, provided on the exposure counter plate and an immediate neighboring numeral provided to be next to the prescribed numeral is the maximum value.

2. The lens-fitted film unit of claim 1, wherein a difference between the prescribed numeral and the immediate neighboring numeral is not less than 4.

3. The lens-fitted film unit of claim 1, wherein the numerals marked on the exposure counter are provided by at least one of molding and printing.

4. The lens-fitted film unit of claim 1, wherein the exposure counter plate is provided with the numerals indicating the number of frames to be exposed, and the immediate neighboring numeral is provided to be next to the prescribed numeral on a downsteam side in a moving direction of the exposure counter plate.

5. The lens-fitted film unit of claim 4, wherein only one distance between the prescribed numeral and the immediate neighboring numeral on the downstream side is greatest.

6. A lens-fitted film unit comprising:
   (a) a photographic film loaded in advance;
   (b) a shutter;
   (c) a picture taking lens;
   (d) an exposure counter plate that is provided with numerals indicating a number of frames to be exposed or a number of frames which has been exposed, and is moved in one direction for each exposure; and
   (e) an exposure counter window through which a numeral on the exposure counter plate is recognized from an outside,
   wherein a distance between a prescribed numeral, which is a numeral in the range from 24 to 30, provided on the exposure counter plate and an immediate neighboring numeral provided to be next to the prescribed numeral on a down side in a moving direction of the exposure counter plate is greater, compared with other distances between other immediate neighboring numerals on the exposure counter plate.

7. The lens-fitted film unit of claim 4, wherein the prescribed numeral is 27, and the immediate neighboring numeral on the downstream side is 32.

8. The lens-fitted film unit of claim 7, wherein on an upstream side of the numeral 27, there are marked numerals down to 3 with a space of two frames therebetween, and on an upstream side of a numeral 3, there is marked a numeral 1 with a space of one frame.

9. The lens-fitted film unit of claim 7, wherein numerals from 32 up to 40 on the exposure counter plate are marked with a space of three numerals corresponding to three frames.

10. A lens-fitted film unit comprising:
(a) a photographic film loaded in advance;
(b) a shutter;
(c) a picture taking lens;
(d) an exposure counter plate that is provided with numerals indicating a number of frames to be exposed or a number of frames which has been exposed, and is moved in one direction for each exposure; and
(e) an exposure counter window through which a numeral on the exposure counter plate is recognized from an outside,
wherein a distance between a prescribed numeral provided on the exposure counter plate and an immediate neighboring numeral provided to be next to the prescribed numeral on a downsteam side in a moving direction of the exposure counter plate is greater, come with other distances between other immediate neighboring numerals on the exposure counter plate, and
wherein any one of a first photographic film having a number of frames to be exposed representing a first number of frames and a second photographic film having a number of frames to be exposed representing a second number of frames that is less than the first number of frames can be loaded in the lens-fitted film unit, and at least one of the first photographic film and the second photographic film is loaded in the lens-fitted film unit in advance, and the prescribed numeral is either one of the second number of frames, a numeral that is more than the second number of frames by 1 and a numeral that is more than the second number of frames by 2.

11. The lens-fitted film unit of claim 10, wherein the distance between the prescribed numeral and the immediate neighboring numeral on the downstream side is determined so that, when the prescribed numeral is located in the exposure counter window at the uppermost position toward the upstream side in the moving direction of the exposure counter plate in a way that the prescribed numeral can be observed totally through the exposure counter window, the immediate neighboring numeral on the downstream side can not be identified through the exposure counter window, and when the prescribed numeral is located in the exposure counter window at the uppermost position toward the upstream side in the moving direction of the exposure counter plate in a way that the prescribed numeral can be observed partially through the exposure counter window, the immediate neighboring numeral on the downstream side can be observed by a part thereof through the exposure counter window.

12. A production method for a lens-fitted film unit package, comprising the steps of:
(a) positioning an exposure counter plate;
(b) packing a lens-fitted film unit with a packing member; and
(c) manufacturing the lens-fitted film unit package,
wherein the lens-fitted film unit comprises a photographic film loaded in advance, a shutter, a picture taking lens, an exposure counter plate that is provided with numerals indicating a number of unexposed frames or a number of frames which has been exposed and is moved in one direction for each exposure, and an exposure counter window through which the numeral on the exposure counter plate can be observed from an outside,
wherein a distance between a prescribed numeral provided on the exposure counter plate and an immediate neighboring numeral provided to be next to the prescribed numeral on a downstream side in a moving direction of the exposure counter plate is guess and
wherein in the step of positioning the exposure counter plate, the positioning is conducted in a state that the prescribed numeral is positioned to be closer to un upstream side than an indicator on the exposure counter window by one frame in the moving direction of the exposure counter plate, and in the step of packing the lens-fitted film unit with the packing member, the packing is conducted in a state that the prescribed numeral is positioned to be closer to the upstream side than the indicator on the exposure counter window by one frame in the moving direction of the exposure counter plate.

13. A lens-fitted film unit comprising:
(a) a photographic film loaded in advance;
(b) a shutter,
(c) a picture taking lens;
(d) an exposure counter plate that is provided with numerals indicating a number of flames to be exposed or a number of frames which has been exposed, and is moved in one direction for each exposure; and
(e) an exposure counter window through which a numeral on the exposure counter plate is recognize from an outside,
wherein the numerals are provided on the exposure counter plate so that a distance between a prescribed numeral provided on the exposure counter plate and an immediate neighboring numeral provided to be next to the prescribed numeral on a downstream side in a moving direction of the exposure counter plate enables the immediate neighboring numeral not to be identified through the exposure counter window under the condition that the prescribed numeral is located at an uppermost position toward an upstream side in the exposure counter window in the moving direction of the exposure counter plate so that the prescribed numeral can be completely identified though the exposure counter window, or enables the immediate neighboring numeral to be partially identified through the exposure counter window under the condition that the prescribed numeral is located at the uppermost position toward the upstream side in the exposure counter window in the moving direction of the exposure counter plate so that the prescribed numeral can be partially identified through the exposure counter window.

* * * * *

UNITED STATES PATENT AND TRADEMARK OFFICE
CERTIFICATE OF CORRECTION

PATENT NO. : 6,480,674 B2  
APPLICATION NO. : 09/725829  
DATED : November 12, 2002  
INVENTOR(S) : Hiroshi Yamaguchi et al.

Page 1 of 1

It is certified that error appears in the above-identified patent and that said Letters Patent is hereby corrected as shown below:

Column 1:
Line 65, after "are", delete "alike" and insert therefor --likely--;

Column 6:
Line 6, after "6", delete "though" and insert therefor --through--;

Column 10:
Line 7, after "of", delete "firms" and insert therefor --frames--;
Line 14, after "so", delete "hat" and insert therefor --that--;

Column 11:
Line 20, after "greater", delete "come" and insert therefor --compared--;

Column 12:
Line 14, after "is", delete "guess" and insert therefor --greatest--;
Line 17, after "closer to", delete "un" and insert therefor --an--;
Line 32, after "of", delete "flames" and insert therefor --frames--.

Signed and Sealed this

Eighth Day of May, 2007

JON W. DUDAS  
*Director of the United States Patent and Trademark Office*